Nov. 6, 1923.
F. LAUHOFF.
RESILIENT WHEEL
Filed Aug. 15, 1921
1,473,483
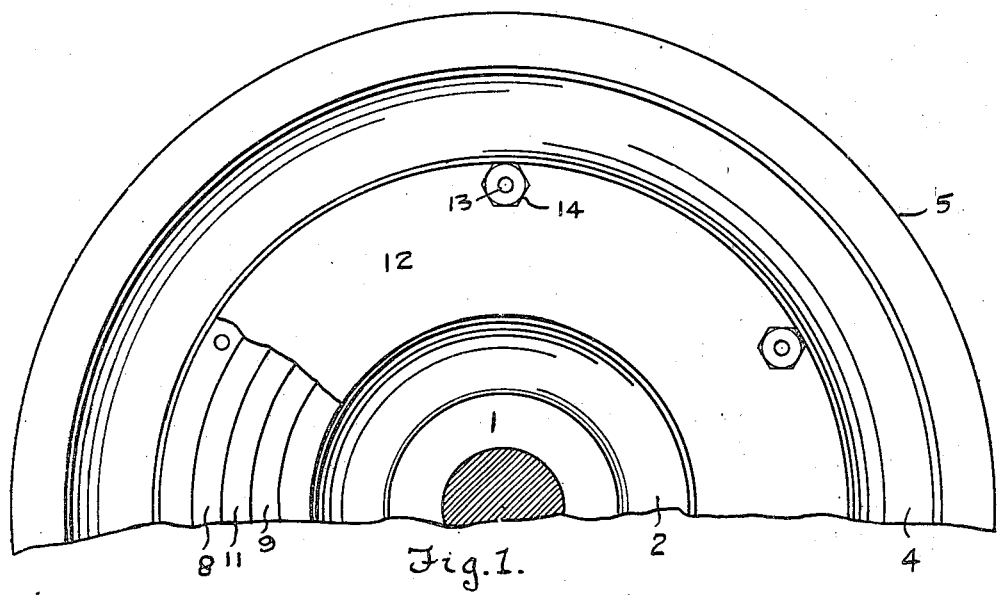
Fig. 1.
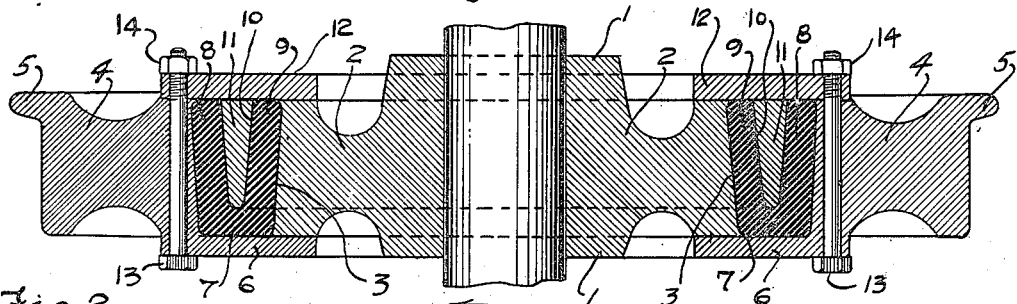
Fig. 2.
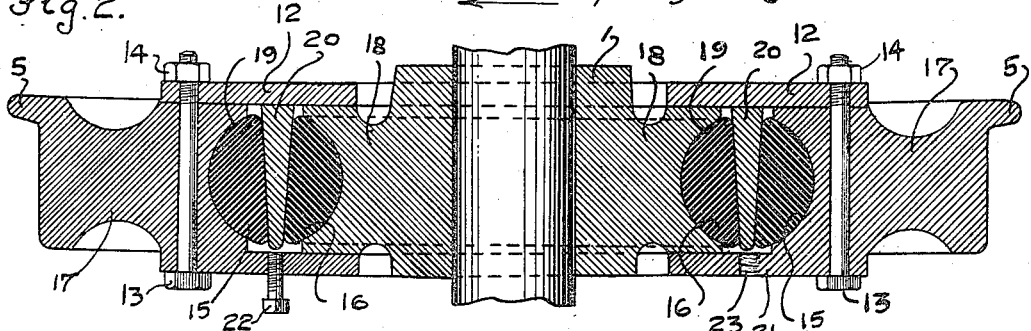
Fig. 3.
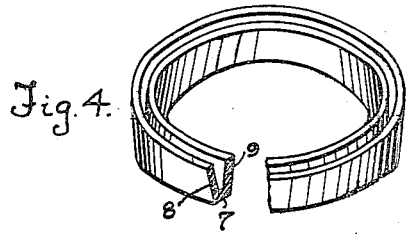
Fig. 4. Fig. 5.
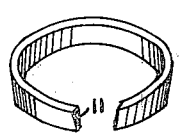
Inventor
FRANK. LAUHOFF.
Barthel & Barthel
Attorneys Patented Nov. 6, 1923.

1,473,483

UNITED STATES PATENT OFFICE.

FRANK LAUHOFF, OF DETROIT, MICHIGAN.

RESILIENT WHEEL.

Application filed August 15, 1921. Serial No. 492,362.

*To all whom it may concern:*

Be it known that I, FRANK LAUHOFF, a citizen of the United States of America, residing at Detroit, in the county of Wayne and State of Michigan, have invented certain new and useful Improvements in Resilient Wheels, of which the following is a specification, reference being had therein to the accompanying drawings.

This invention relates to resilient wheels and has special reference to that class of wheels wherein resilient or cushion bodies are interposed between the rim or felly and the hub or web portion of a wheel, so that any load on the wheel hub will be cushioned or yieldably held relative to the periphery of the wheel. In this class of wheels the effective area of the cushion or yieldable body is restricted to approximately one-third the area of the body or wheel, when a load is on the wheel hub, such area being generally under the hub with the ineffective area above the hub. This is because no means has heretofore been provided to distribute the pressure on the wheel hub throughout the cushion or resilient body. In some instances there has been a multiplicity of independent resilient devices circumferentially disposed about a wheel and because of the arrangement of such devices only a few are active at one time for yieldably sustaining the load. In other instances there have been continuous or circumferential cushion or resilient bodies in a wheel, but the constructive arrangement of parts has been such that pressure on the wheel hub was sustained only by a portion of such bodies.

My invention aims to provide positive and reliable means, in a manner as hereinafter set forth, for distributing hub pressure throughout circumferentially disposed cushion or resilient bodies in a wheel. The means which I employ is adjustable to compensate for wear of the bodies and provide a desired degree of compression in connection with the bodies.

My invention further aims to provide a resilient wheel that may be advantageously used for the rolling stock of railways, although features of my invention may be embodied in a vehicle wheel, as the rim, tread or tire of the wheel forms no part of my invention other than contributing to a complete structure.

The construction entering into my invention will be hereinafter described and then claimed, and reference will now be had to the drawing, wherein—

Figure 1 is a side elevation of a portion of a wheel partly broken away;

Fig. 2 is a horizontal sectional view of the wheel showing one form of a cushion body;

Fig. 3 is a similar view showing another form of cushion body, and

Fig. 4 is a perspective view of a portion of the cushion body shown in Fig. 2.

Fig. 5 is a similar view of a pressure distributing member.

In the drawing, the reference numeral 1 denotes a wheel hub having a body or web 2 and the periphery 3 of the web is tapered inwardly from the outer side of the web to the inner side thereof.

4 denotes a rim or felloe that may have a peripheral side flange 5, especially when the wheel is used for the rolling stock of a steam or electric railway. The inner annular wall of the rim 4 is tapered reversely to the periphery of the web 2, that is, it is tapered inwardly from the inner side of the rim to the outer side thereof, and at the outer side of the rim there is an annular inwardly projecting flange or abutment 6.

7 denotes an annulus or cushion body having a rim engaging portion 8 and a hub or web engaging portion 9, said cushion body being substantially channel shaped with the portions 8 and 9 thereof diverging and thus providing an annular recess 10 with inwardly tapering walls and in which an annular pressure distributing member 11 may be mounted, said member being tapered or wedge shaped in cross section. The relative sizes of the rim and hub web are such as to permit of the cushion body 7 being interposed between the rim and hub web in engagement with the rim abutment 6.

12 denotes a side plate or ring engaging the inner side or face of the hub web 2 and preferably connected to the rim 4 by bolts 13 and nuts 14 for other fastening means. The side plate 12 is as though integral with the rim 4 and cooperates with the rim abutment 6 in providing an annular channel in which the hub web may shift to compress the cushion body 7, which may be made of rubber or any yieldable material or composition. The side plate 12 retains the pressure distributing member 11 in or between the portions 8 and 9 of the cushion body and prevents displacement of said member. It has been shown as seated with the cushion body as fully compressed as far as possible by the member 11, and when first placed in use, should the member 11 protrude from the cushion body 7 it can be forced inwardly between the portions 8 and 9 from time to time by tightening the bolts and nuts to further compress such portions.

Before describing the action of the pressure distributing member 11, as shown in Fig. 2, reference will be had to Fig. 3 showing a cushion body made of separable rim and hub engaging portions 15 and 16, said portions being each annular and substantially semi-cylindrical in cross section and the confronting walls of the wheel rim 17 and the hub web 18 are provided with annular grooves 19 to receive the portions of the cushion body. The portions 15 and 16 being separable, a pressure distributing member 20 may be placed between said portions to have a wedging action therebetween and the member 20 is of greater width than the member 11, so that its inner edge will be in proximity to the rim abutment 21. This permits of the rim abutment being utilized as a support for one or more screws 22 that may be employed in threaded openings 23 of the abutment 21 for forcing the pressure distributing member 20 from between the portions 15 and 16 of the cushion body.

Assuming that hub pressure is in the direction of the arrow, shown in Fig. 2, the hub web will compress the portion 9 of the cushion body 7 and through the medium of the pressure distributing member 11 the portion 8 will also be compressed.

It will be noted that the cushion body is enclosed and protected against the elements, stone bruise and injury incident to operating the wheel on a rail or road. Since the cushion body is compressible the pressure distributing member may be adjusted to compensate for wear of the cushion body and provide a desired degree of yielding between the rim and hub of the wheel.

It is thought that the utility of my wheel will be apparent without further description, and while in the drawing there are illustrated the preferred embodiments of my invention, it is to be understood that the structural elements are susceptible to such changes, in size, shape and manner of assembly, as fall within the scope of the appended claims.

What I claim is:—

1. In a wheel, a hub, a rim, an annular cushion body about said hub for the wheel, said body having spaced rim and hub engaging portions of such cross sectional configuration as to engage in said hub and rim and be held against lateral displacement, and means wedged between said body portions adapted to compensate for wear of said cushion body.

2. In a wheel, a rim, a movable hub, an annular resilient body between said rim and hub, a rim abutment for said body, an annular wedge member extending through said body, and means retaining said wedge member in said body, said means co-operating with said rim abutment in guiding movement of said hub relative to said rim.

3. In a wheel, a hub, a rim, an annular member between said rim and hub, and in spaced relation to each, an annular cushion member between said rim and said annular member, an annular cushion member between said hub and said annular member, each of said cushioning members being semi-cylindrical in cross section, and said annular member having a configuration to cause simultaneous compression of both of said cushioning members by lateral adjustment of said annular member.

In testimony whereof I affix my signature in presence of two witnesses.

FRANK LAUHOFF.

Witnesses:
ANNA M. DORR,
KARL H. BUTLER.